United States Patent
Li et al.

(10) Patent No.: US 11,990,694 B2
(45) Date of Patent: *May 21, 2024

(54) MULTIFUNCTIONAL HIGH-VOLTAGE CONNECTOR AND BATTERY PRODUCT

(71) Applicant: CONTEMPORARY AMPEREX TECHNOLOGY CO., LIMITED, Ningde (CN)

(72) Inventors: Jianwei Li, Ningde (CN); Cong Bao, Ningde (CN); Mingping Yang, Ningde (CN); Libing Chan, Ningde (CN); Linggang Zhou, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,944

(22) Filed: Jan. 11, 2023

(65) Prior Publication Data
US 2023/0170634 A1  Jun. 1, 2023

Related U.S. Application Data

(63) Continuation of application No. 16/512,184, filed on Jul. 15, 2019, now Pat. No. 11,581,669.

(30) Foreign Application Priority Data

Aug. 15, 2018 (CN) .......................... 201821317464.5

(51) Int. Cl.
*H01M 50/583* (2021.01)
*H01M 50/502* (2021.01)
(Continued)

(52) U.S. Cl.
CPC ........ *H01R 11/287* (2013.01); *H01M 50/502* (2021.01); *H01M 50/503* (2021.01);
(Continued)

(58) Field of Classification Search
None
See application file for complete search history.

(56) References Cited

U.S. PATENT DOCUMENTS 7,893,809 B2   2/2011   Head
9,509,096 B2   11/2016  Zhao et al.
(Continued)

FOREIGN PATENT DOCUMENTS

CN   206864727 U   1/2018
EP   3611802 A1    2/2020

OTHER PUBLICATIONS

State Intellectual Property Office of China Notice of Grant of Invention Patent Right for Application No. 201821317464.5 Dec. 21, 2018 2 pages (including translation).
(Continued)

*Primary Examiner* — Lucas J. O'Donnell
(74) *Attorney, Agent, or Firm* — ANOVA LAW GROUP, PLLC

(57) ABSTRACT

The present disclosure provides a multifunctional high-voltage connector and a battery product, the multifunctional high-voltage connector comprises: an upper cover; a pedestal; a conductive connection structure; two mating terminals; and a harness assembly. The conductive connection structure is used to make the two mating terminals be connected in series, and the harness assembly is directly connected to one of the mating terminals. When the upper cover and the pedestal are assembled, the conductive connection structure is simultaneously in contact with the two mating terminals, thereby turning on the high-voltage cir-
(Continued)

cuit. When the battery product requires maintenance, the upper cover is directly detached from the base, thereby turning off the high-voltage circuit. The battery product can be electrically connected to an external device via the harness assembly. The multifunctional high-voltage connector integrates both a switch function and a high-voltage connection function, therefore the connection resistance is greatly reduced.

17 Claims, 13 Drawing Sheets

(51) Int. Cl.
  *H01M 50/503* (2021.01)
  *H01M 50/51* (2021.01)
  *H01M 50/581* (2021.01)
  *H01R 11/01* (2006.01)
  *H01R 11/28* (2006.01)
  *H01R 13/68* (2011.01)
  *H01R 13/703* (2006.01)
  *H01R 31/06* (2006.01)

(52) U.S. Cl.
  CPC ......... *H01M 50/51* (2021.01); *H01M 50/581* (2021.01); *H01R 11/01* (2013.01); *H01R 13/68* (2013.01); *H01R 13/7031* (2013.01); *H01R 31/065* (2013.01); *H01M 2200/103* (2013.01)

(56) References Cited

U.S. PATENT DOCUMENTS

| | | |
|---|---|---|
| 10,777,930 B2 | 9/2020 | Li et al. |
| 2009/0309689 A1 | 12/2009 | Pavlovic et al. |
| 2018/0034219 A1 | 2/2018 | Tyler et al. |
| 2018/0076575 A1 | 3/2018 | Ramunno |

OTHER PUBLICATIONS

The European Patent Office (EPO) The Extended European Search Report for Application No. 19188030.1 Jan. 2, 2020 6 Pages.
The European Patent Office (EPO) First Office Action for Application No. 19188030.1 Jul. 28, 2021 3 Pages.
The European Patent Office (EPO) The Second Office Action for Application No. 19188030.1 Sep. 8, 2022 6 Pages.
United States Patent and Trademark Office (USPTO) Advisory Action for U.S. Appl. No. 16/512,184, filed Dec. 27, 2021 3 Pages.
United States Patent and Trademark Office (USPTO) Final Office Action for U.S. Appl. No. 16/512,184, filed Oct. 12, 2021 19 Pages.
United States Patent and Trademark Office (USPTO) Final Office Action for U.S. Appl. No. 16/512,184, filed Jul. 26, 2022 24 Pages.
United States Patent and Trademark Office (USPTO) Non-Final Office Action for U.S. Appl. No. 16/512,184, filed Jun. 4, 2021 14 Pages.
United States Patent and Trademark Office (USPTO) Non-Final Office Action for U.S. Appl. No. 16/512,184, filed Mar. 9, 2022 17 Pages.
United States Patent and Trademark Office (USPTO) Notice of Allowance for U.S. Appl. No. 16/512,184, filed Oct. 13, 2022 9 Pages.
Turska Matti, High Boltage Components In Commercial Vehicles, Lapland University of Applied Sciences, 2017.

MULTIFUNCTIONAL HIGH-VOLTAGE CONNECTOR AND BATTERY PRODUCT

CROSS-REFERENCE TO RELATED APPLICATIONS

The present application is a continuation of U.S. patent application Ser. No. 16/512,184, which claims priority to Chinese patent application No. CN201821317464.5, filed on Aug. 15, 2018, which is incorporated herein by reference in its entirety.

FIELD OF THE PRESENT DISCLOSURE

The present disclosure relates to the field of connector technology, and particularly relates to a multifunctional high-voltage connector and a battery product.

BACKGROUND OF THE PRESENT DISCLOSURE

In the battery product (such as a battery pack or a high-voltage cartridge), the common types of connectors generally include: high-voltage connector, Manual Service Disconnect (MSD), and fuse. The high-voltage connector is used for realizing electrical connection between the battery product and an external device (such as another battery pack or another high-voltage cartridge), the MSD is used for controlling the operation of turning on or turning off the high-voltage circuit of the battery product, and the fuse is used for providing an overload protection for the high-voltage circuit in the battery product.

Because the existing three types of connectors are independent components, when at least above two types of connectors are required based on the using requirements of the battery product, the following problems will occur: (1) the two types of connectors need to be connected by an adapter sheet, thereby increasing the connection resistance in the battery product; (2) different holes need to be provide on the box of the battery product to respectively mount the different connectors, which is not beneficial to the integration of the battery product; (3) because the number of the holes provided on the box of the battery product is more, which increases the interfaces to be sealed, thereby reducing the sealing reliability of the battery product; (4) the multiple types of connectors are simultaneously arranged, which increases the mounting space of the battery product.

SUMMARY OF THE PRESENT DISCLOSURE

In view of the problem existing in the background, an object of the present disclosure is to provide a multifunctional high-voltage connector and a battery product, because the multifunctional high-voltage connector integrates the functions of different connectors, when the multifunctional high-voltage connector is applied to the battery product, the space occupied by the multifunctional high-voltage connector in the battery product is small, which improves the integration of the battery product and reduces the connection resistance in the high-voltage circuit of the battery product.

In order to achieve the above object, the present disclosure provides a multifunctional high-voltage connector, which comprises: an upper cover; a pedestal detachably assembled with the upper cover; a conductive connection structure fixedly mounted to the upper cover; two mating terminals spaced apart from each other in a length direction, and each of the mating terminals is fixedly mounted to the pedestal; and a harness assembly fixedly mounted to the pedestal. The conductive connection structure is used to connect the two mating terminals in series, and the harness assembly is directly connected to one of the mating terminals.

The conductive connection structure comprises: a main body portion; and two conductive connection portions respectively positioned at both ends of the main body portion in the length direction, and each of the conductive connection portions is connected to the main body portion. The two conductive connection portions of the conductive connection structure are used to respectively insert into the two mating terminals.

The conductive connection structure is an one-piece structure, and each conductive connection portion directly protrudes from the main body portion in a height direction.

The conductive connection structure is a fuse.

The upper cover comprises: an outer shell; an inner shell fixed inside the outer shell, and the inner shell is provided with an opening facing the outer shell in a height direction; and at least one insulation sheet, each insulation sheet is fixed to the inner shell. Each conductive connection portion and the main body portion of the conductive connection structure are accommodated in the inner shell via the opening of the inner shell, the insulation sheet isolates the conductive connection structure from the outer shell at the opening of the inner shell.

The insulation sheet has: an isolating portion extending in a width direction; and a fixing portion positioned on one side of the isolating portion in the width direction and extending in the height direction. The isolating portion of the insulation sheet isolates the conductive connection structure from the outer shell at the opening of the inner shell, and the fixing portion is fixed to the inner shell.

The insulation sheet further has: a plurality of supporting portions extending in the height direction and disposed opposite to the fixing portion, and the supporting portion is supported between the isolating portion and the outer shell.

The fixing portion of the insulation sheet is provided as two in number, and the two fixing portions are respectively formed on both sides of the isolating portion in the width direction. The insulation sheet is provided as one in number, and the isolating portion of the insulation sheet extends in the length direction and covers the whole surface of the entire conductive connection structure facing the outer shell; or the insulation sheet is provided as two in number, and the two insulation sheets are spaced apart from each other in the length direction and respectively cover both ends of the conductive connection structure in the length direction.

The fixing portion of the insulation sheet is provided as one in number. The insulation sheet is provided as four in number and disposed in two pairs, the two pairs of insulation sheets are spaced apart from each other in the length direction. The two insulation sheets of each pair are disposed facing each other in the width direction and respectively cover both ends of the conductive connection structure in the width direction.

The present disclosure further provides a battery product, which comprises a battery assembly, a box, and the multifunctional high-voltage connector described above, the pedestal of the multifunctional high-voltage connector is fixedly mounted to the box, the battery assembly is directly connected to the other of the mating terminals.

The present disclosure has the following beneficial effects: when the upper cover and the pedestal of the multifunctional high-voltage connector are assembled, the conductive connection structure is simultaneously in contact with the two mating terminals, and at this time the two mating terminals are connected in series, thereby turning on the high-voltage circuit in the battery product. When the battery product requires maintenance, the upper cover is directly detached from the base, and at this time the conductive connection structure is separated from the two mating terminals, thereby turning off the high-voltage circuit in the battery product. Moreover, the battery product can be electrically connected to an external device via the harness assembly of the multifunctional high-voltage connector. Therefore, the multifunctional high-voltage connector integrates both a switch function and a high-voltage connection function. The conductive connection structure and the two mating terminals are equivalent to a switch function component, the harness assembly is equivalent to a high-voltage connection function component, and because the high-voltage connection function component is directly electrically connected with the switch function component, the connection resistance in the high voltage circuit of the battery product is greatly reduced; and because the high-voltage connection function component and the switch function component share the same pedestal, the space occupied by the multifunctional high-voltage connector in the battery product is reduced and the integration of the battery product is improved.

Figure 1:
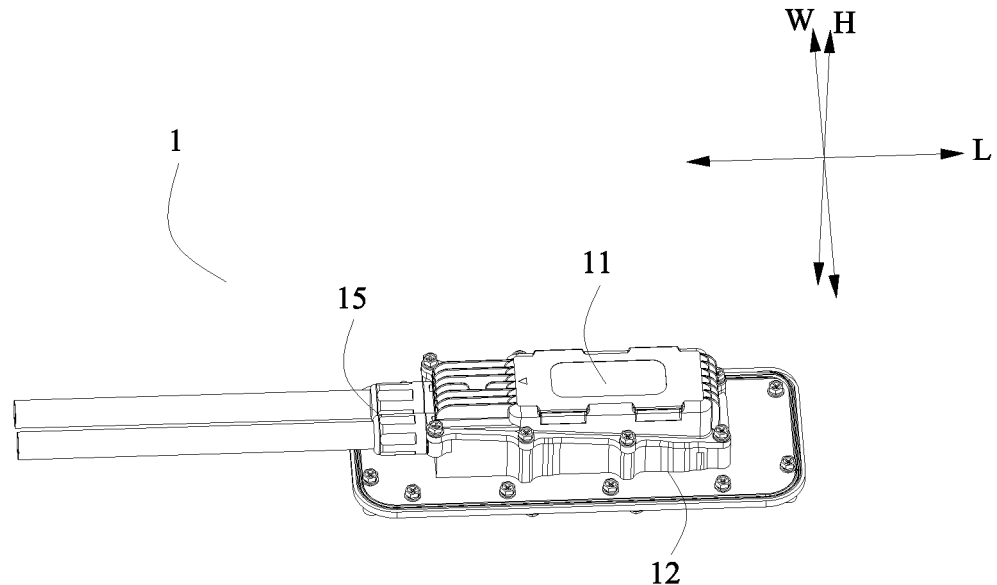
FIG. 1 is a perspective view of a multifunctional high-voltage connector according to the present disclosure.

Reference numerals are represented as follows:
1 multifunctional high-voltage connector
11 upper cover
111 outer shell
112 inner shell
1121 first receiving portion
11211 limiting projection
1122 second receiving portion
11221 recessed groove
1123 extending portion
113 insulation sheet
1131 isolating portion
1132 fixing portion
1133 supporting portion
12 pedestal
121 base
1211 first bottom plate portion
1212 assembling portion
1213 side plate portion
1214 first latching portion
122 mounting seat
1221 second bottom plate portion
1222 mounting portion
13 conductive connection structure
131 main body portion
132 conductive connection portion
1321 first contact segment
13211 injection-adhesive hole
13212 first connection hole
13213 second connection hole
13214 third connection hole
1322 second contact segment
13221 first avoiding hole
13222 second avoiding hole
1323 transitional connection segment
14 mating terminal
141 elastic sheet
1411 body portion
1412 elastic contact portion
14121 first extending segment
14122 second extending segment
142 connection sheet
1421 first connecting portion
1422 second connecting portion
1423 third connecting portion 143 protective shell
1431 first side wall
1432 second side wall
1433 top wall
1434 second latching portion
15 harness assembly
151 connection terminal
152 wire
L length direction
H height direction
W width direction

DETAILED DESCRIPTION

Hereinafter a multifunctional high-voltage connector and a battery product according to the present disclosure will be described in detail in combination with the figures.

A battery product according to the present disclosure comprises a battery assembly (not shown), a box (not shown) and a multifunctional high-voltage connector 1. The battery assembly is accommodated in the box and comprises a plurality of batteries, the multifunctional high-voltage connector 1 is fixedly mounted to the box and electrically connected to the battery assembly.

Referring to FIG. 1 to FIG. 4, the multifunctional high-voltage connector 1 may comprise an upper cover 11, a pedestal 12, a conductive connection structure 13, two mating terminals 14 and a harness assembly 15. The upper cover 11 and the pedestal 12 are detachably assembled. The conductive connection structure 13 is fixedly mounted to the upper cover 11. The two mating terminals 14 are spaced apart from each other in a length direction L, and each of the mating terminals 14 is fixedly mounted to the pedestal 12. The harness assembly 15 is fixedly mounted to the pedestal 12 and directly connected to one of the mating terminals 14.

The multifunctional high-voltage connector 1 is fixedly mounted to the box via the pedestal 12 and electrically connected to the battery assembly via the other of the mating terminals 14 (which is opposite to the mating terminal 14 directly connected to the harness assembly 15), thus the multifunctional high-voltage connector 1 is connected into a high-voltage circuit in the battery product. When the upper cover 11 and the pedestal 12 of the multifunctional high-voltage connector 1 are assembled, the conductive connection structure 13 is simultaneously in contact with the two mating terminals 14, and at this time the two mating terminals 14 are connected in series, thereby turning on the high-voltage circuit in the battery product. When the battery product requires maintenance, the upper cover 11 is directly detached from the base 12, and at this time the conductive connection structure 13 is separated from the two mating terminals 14, thereby turning off the high-voltage circuit in the battery product. Moreover, the battery product can be electrically connected to an external device (such as another battery pack or a high-voltage cartridge) via the harness assembly 15 of the multifunctional high-voltage connector 1. Therefore, the multifunctional high-voltage connector 1 integrates both a switch function and a high-voltage connection function.

The conductive connection structure 13 and the two mating terminals 14 are equivalent to a switch function component, the harness assembly 15 is equivalent to a high-voltage connection function component, and because the high-voltage connection function component is directly electrically connected with the switch function component, the connection resistance in the high voltage circuit of the battery product is greatly reduced; and because the high-voltage connection function component and the switch function component share the same pedestal 12, the space occupied by the multifunctional high-voltage connector 1 in the battery product is reduced and the integration of the battery product is improved.

Referring to FIG. 2, FIG. 3, FIG. 6 and FIG. 8, the conductive connection structure 13 of the multifunctional high-voltage connector 1 may comprise: a main body portion 131; and two conductive connection portions 132 respectively positioned at both ends of the main body portion 131 in the length direction L, and each of the conductive connection portions 132 is connected to the main body portion 131. When the upper cover 11 and the pedestal 12 are assembled, the two conductive connection portions 132 of the conductive connection structure 13 are respectively inserted into the two mating terminals 14.

Figure 3:
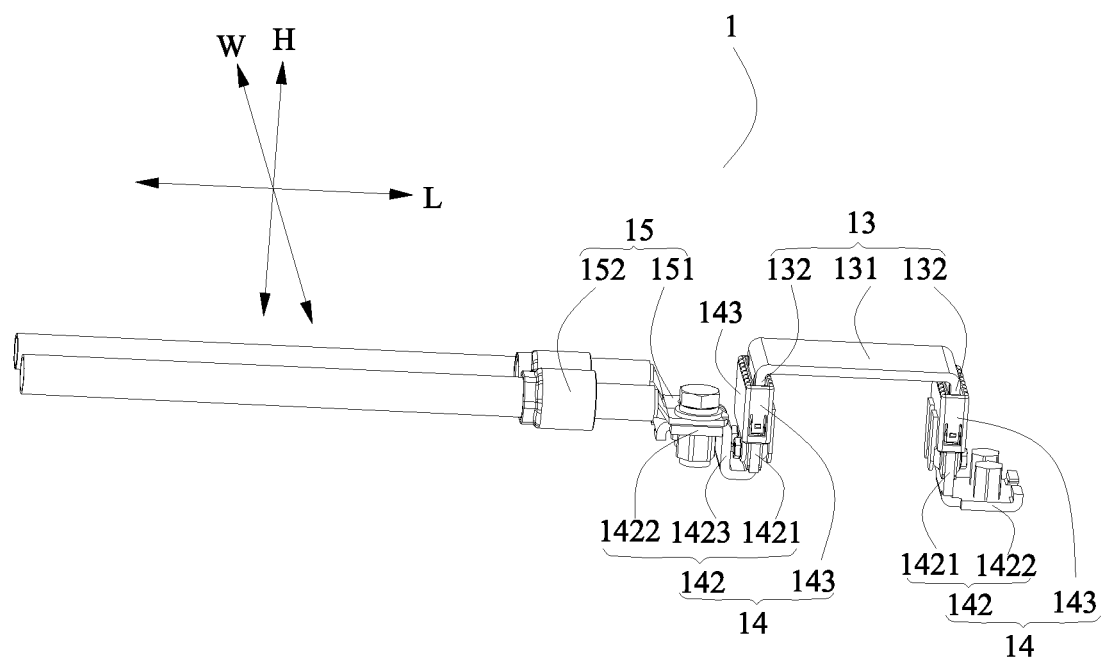
FIG. 3 is a schematic view showing an electrical connection relationship of components in the multifunctional high-voltage connector in another embodiment, in which the conductive connection structure is an one-piece structure.
Figure 4:
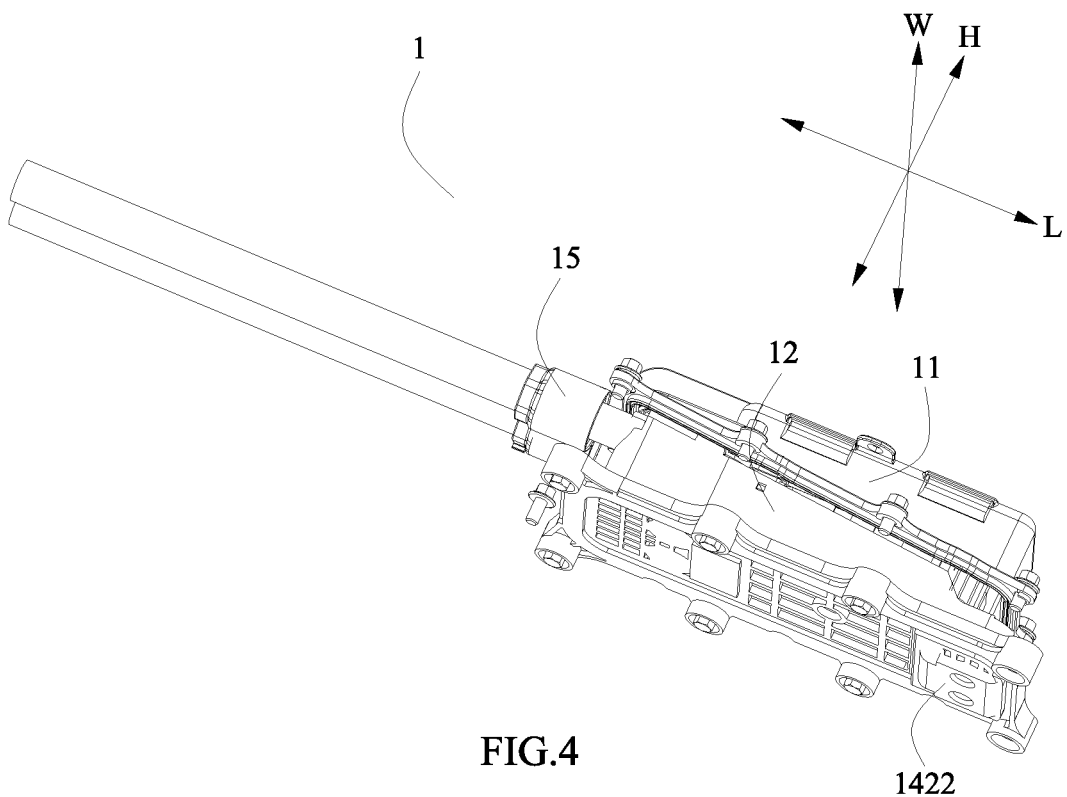
FIG. 4 is a perspective view of the multifunctional high-voltage connector of FIG. 1 with a mounting seat of a pedestal removed.
Figure 5:
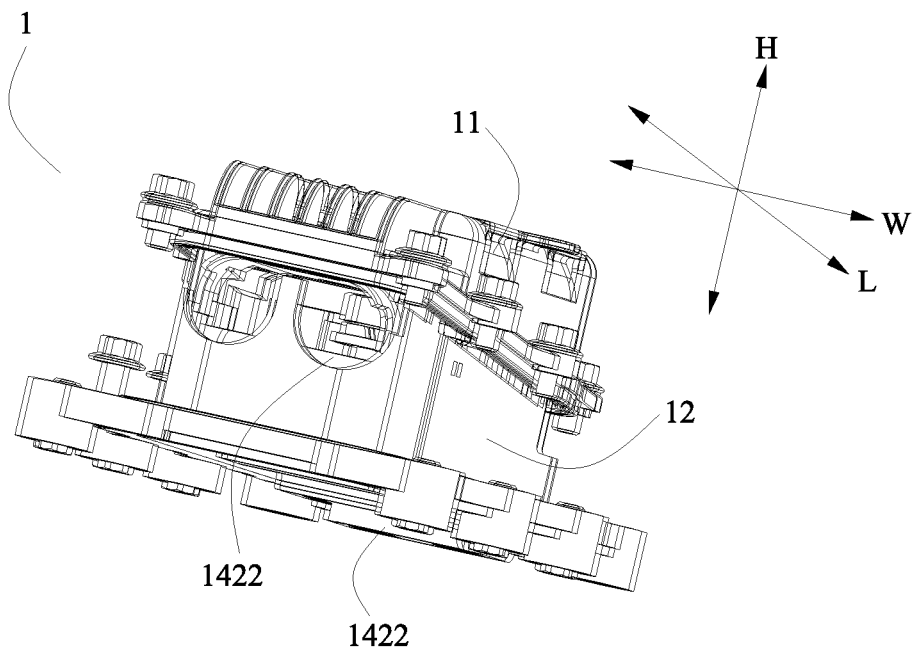
FIG. 5 is a perspective view of the multifunctional high-voltage connector of FIG. 4 with a harness assembly removed.
Figure 8:
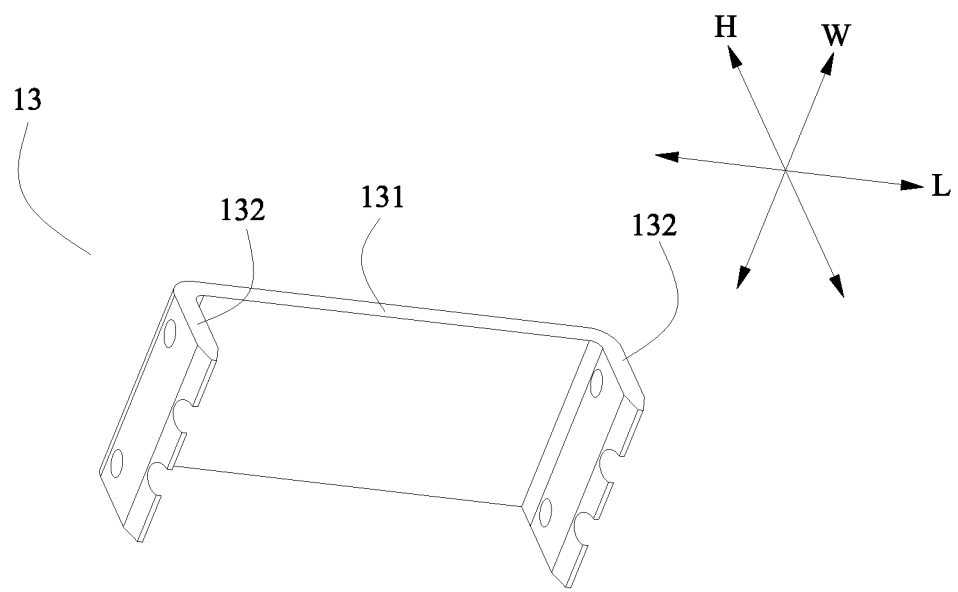
FIG. 8 is a perspective view of the conductive connection structure of FIG. 3.

In an embodiment, the conductive connection structure 13 may be an one-piece structure (that is a whole piece of connection sheet), the conductive connection portion 132 of the conductive connection structure 13 directly protrudes from the main body portion 131 in a height direction H and may be integrally formed with the main body portion 131, as shown in FIG. 3 and FIG. 8. At this time, the conductive connection structure 13 and the two mating terminals 14 are only equivalent to the switch function component for turning off or turning on the high-voltage circuit in the battery product.

Figure 2:
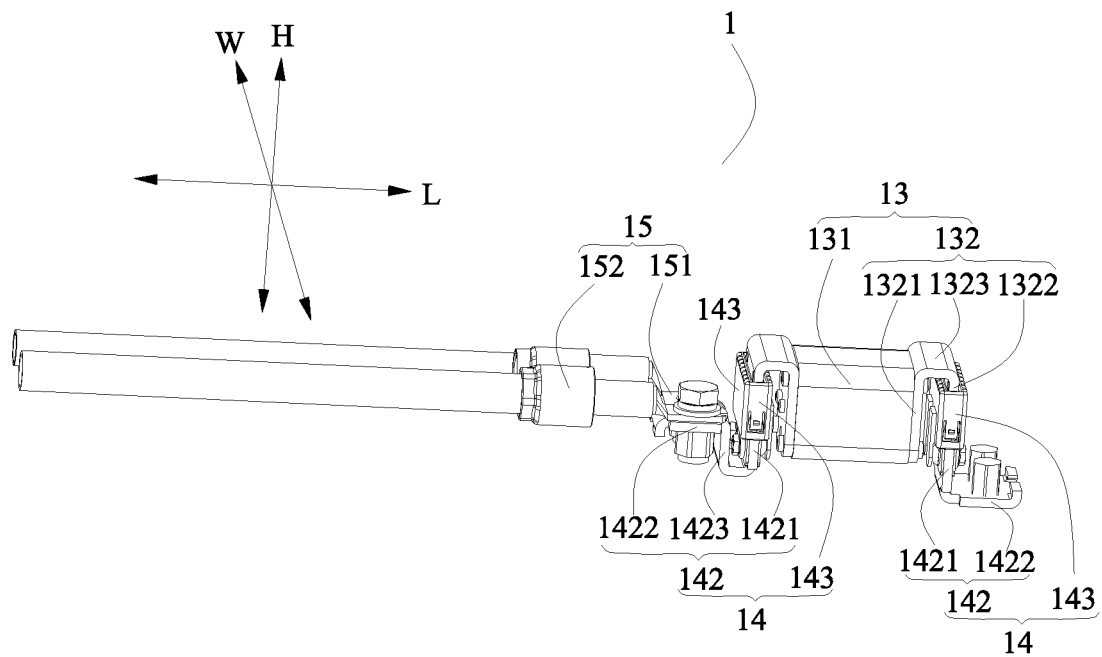
FIG. 2 is a schematic view showing an electrical connection relationship of components in the multifunctional high-voltage connector in an embodiment, in which a conductive connection structure is a fuse.
Figure 6:
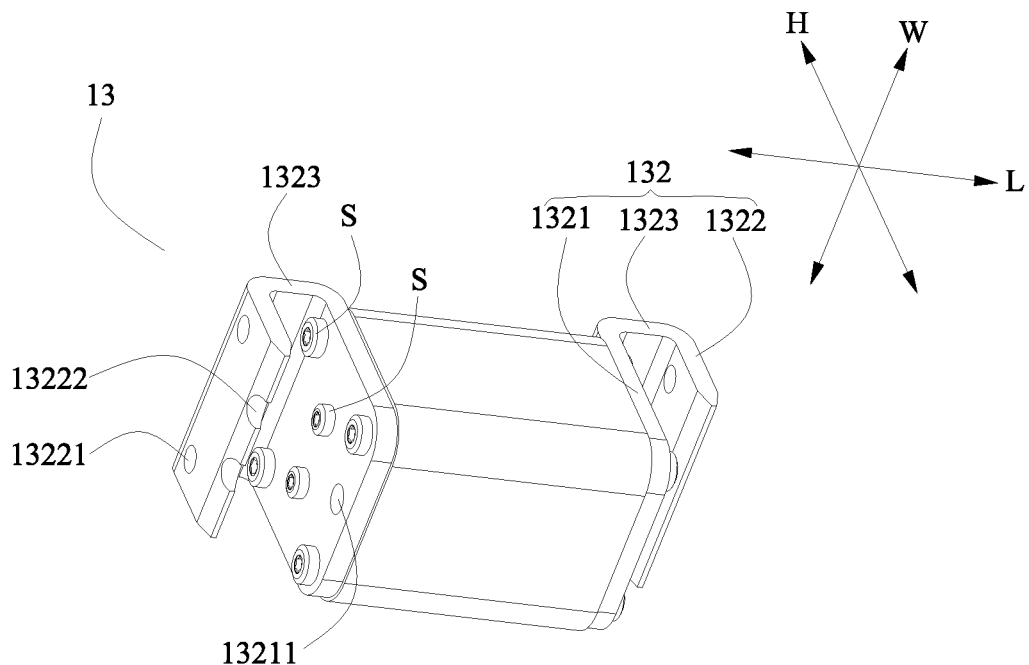
FIG. 6 is a perspective view of the conductive connection structure of FIG. 2.

In another embodiment, the conductive connection structure 13 can be a fuse, as shown in FIG. 2 and FIG. 6. Because the fuse has a self-fusing function, it can provide an overload protection for the high-voltage circuit in the battery product. Therefore, the multifunctional high-voltage connector 1 not only integrates the switch function and the high-voltage connection function, but also has a circuit overload-protection function, thereby further improving the integration of the battery product.

When the conductive connection structure 13 is the fuse, referring to FIG. 2 and FIG. 6, the main body portion 131 of the conductive connection structure 13 may comprise: a tube body having openings formed at both ends in the length direction L; and a conductive fusing body (not shown) accommodated in the tube body via the opening. When the current in the high-voltage circuit of the battery product is excessively large, the conductive fusing body of the conductive connection structure 13 generates sufficient heat under the action of the excessively large current and fuses itself, thereby achieving the over-current protection for the battery product.

Referring to FIG. 2 and FIG. 6, the conductive connection portion 132 of the conductive connection structure 13 is an independent connection sheet structure and needs to be assembled with the tube body and the conductive fusing body of the main body portion 131. Specifically, the conductive connection portion 132 may have: a first contact segment 1321 connected to the conductive fusing body and sealing a corresponding opening of the tube body; a second contact segment 1322 spaced apart from the first contact segment 1321 in the length direction L and extending in the height direction H; and a transitional connection segment 1323 positioned between the second contact segment 1322 and the first contact segment 1321 and connected with the second contact segment 1322 and the first contact segment 1321. When the upper cover 11 and the pedestal 12 of the multifunctional high-voltage connector 1 are assembled, the second contact segment 1322 of each of the conductive connection portions 132 of the conductive connection structure 13 is directly inserted into the corresponding mating terminal 14 to turn on the high-voltage circuit in the battery product.

In order to facilitate the assembling of the fuse, generally, the conventional fuse is additionally provided with a package plate to seal the opening of the tube body, and at this time a part of the conductive connection portion of the fuse needs to pass through the package plate and extend into the tube body so as to be connected with the conductive fusing body, or a part of the conductive fusing body passes through the package plate and extends out of the tube body so as to be connected with the conductive connection portion. In the multifunctional high-voltage connector 1 of the present disclosure, referring to FIG. 2 and FIG. 6, because the first contact segment 1321 of each of the conductive connection portions 132 of the conductive connection structure 13 directly seals the corresponding opening of the tube body, therefore it is not necessary to additionally provide the package plate, thereby making the structure of the conductive connection structure 13 simple and the volume of the conductive connection structure 13 small, reducing the assembling steps, and improving the space utilization of the multifunctional high-voltage connector 1. Moreover, when the upper cover 11 and the pedestal 12 of the multifunctional high-voltage connector 1 are assembled, the second contact segment 1322 of each of the conductive connection portions 132 of the conductive connection structure 13 is directly inserted into the corresponding mating terminal 14, therefore it is not necessary to use an adapter sheet to connect the conductive connection structure 13 and the mating terminal 14, thereby further reducing the connection resistance in the high-voltage circuit of the battery product.

Figure 7:
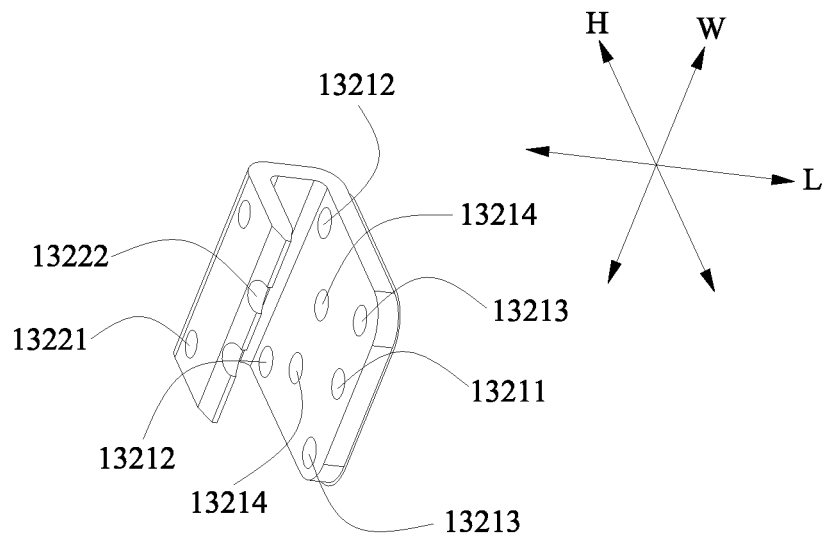
FIG. 7 is a perspective view of a conductive connection portion of FIG. 6.

Referring to FIG. 2, FIG. 6 and FIG. 7, the first contact segment 1321, the transitional connection segment 1323 and the second contact segment 1322 of the conductive connection portion 132 of the conductive connection structure 13 form a U-shaped structure.

Referring to FIG. 7, the first contact segment 1321 of the conductive connection portion 132 may be provided with: a first connection hole 13212 provided on a portion of the first contact segment 1321 close to the transitional connection segment 1323 in the height direction H, and a second connection hole 13213 provided on a portion of the first contact segment 1321 away from the transitional connection segment 1323 in the height direction H. The first contact segment 1321 is fixedly connected to the tube body of the main body portion 131 with the first connection hole 13212 and the second connection hole 13213.

The first contact segment 1321 may be fixedly connected to the tube body of the main body portion 131 by a fastener S (such as a bolt). In order to ensure the heat dissipation of the conductive connection structure 13 itself, the tube body may be made of a ceramic material.

Referring to FIG. 7, the first contact segment 1321 may further be provided with a third connection hole 13214 provided between the first connection hole 13212 and the second connection hole 13213 in the height direction H. The first contact segment 1321 is fixedly connected to the tube body of the main body portion 131 with the third connection hole 13214.

The first contact segment 1321 may be fixedly connected to the conductive fusing body of the main body portion 131 by a fastener S. Of course, the first contact segment 1321 may also be welded (for example laser welded, ultrasonically welded and so on) to the conductive fusing body of the main body portion 131.

During the assembling process of the conductive connection structure 13, for the convenience of assembling, the second contact segment 1322 may be provided with: a first avoiding hole 13221 aligned with the first connection hole 13212 in the length direction L; and a second avoiding hole 13222 aligned with the third connection hole 13214 in the length direction L.

The assembling process of the conductive connection structure 13 is described as follows: firstly, the first contact segment 1321 of one of the conductive connection portions 132 is fixedly connected with the conductive fusing body of the main body portion 131; then, the conductive fusing body and the one of the conductive connection portions 132 connected together pass through the tube body via the opening of the tube body and the first contact segment 1321 of the conductive connection portion 132 is fixed to the tube body of the main body portion 131; finally, the first contact segment 1321 of the other of the conductive connection portions 132 is fixedly connected with the conductive fusing body of the main body portion 131 and the first contact segment 1321 of the other of the conductive connection portions 132 is fixed to the tube body of the main body portion 131.

After the assembling of the conductive connection structure 13 is completed, in order to ensure the sealing between the conductive connection portion 132 and the main body portion 131, the first contact segment 1321 of the conductive connection portion 132 may further be provided with an injection-adhesive hole 13211 for filling a sealing adhesive between the first contact segment 1321 and the tube body.

Referring to FIG. 9 to FIG. 14, the upper cover 11 may comprise: an outer shell 111; an inner shell 112 fixed inside the outer shell 111, and the inner shell 112 is provided with an opening facing the outer shell 111 in the height direction H; and at least one insulation sheet 113, each insulation sheet 113 is fixed to the inner shell 112. Each conductive connection portion 132 and the main body portion 131 of the conductive connection structure 13 are accommodated in the inner shell 112 via the opening of the inner shell 112, the insulation sheet 113 isolates the conductive connection structure 13 from the outer shell 111 at the opening of the inner shell 112. Here, the outer shell 111, the inner shell 112 and the insulation sheet 113 are separately molded and then assembled together, which replaces the conventional molding process of double injection, thereby simplifying the production process of the multifunctional high-voltage connector 1, improving the production efficiency, and reducing the weight.

In order to ensure the heat dissipation of the upper cover 11, the outer shell 111 may be made of a metal material, the inner shell 112 may be provided with a plurality of through holes. The material of the inner shell 112 may be PBT, PPT or the like, and the material of the insulation sheet 113 may be PPT, PA66 or the like.

Figure 15:
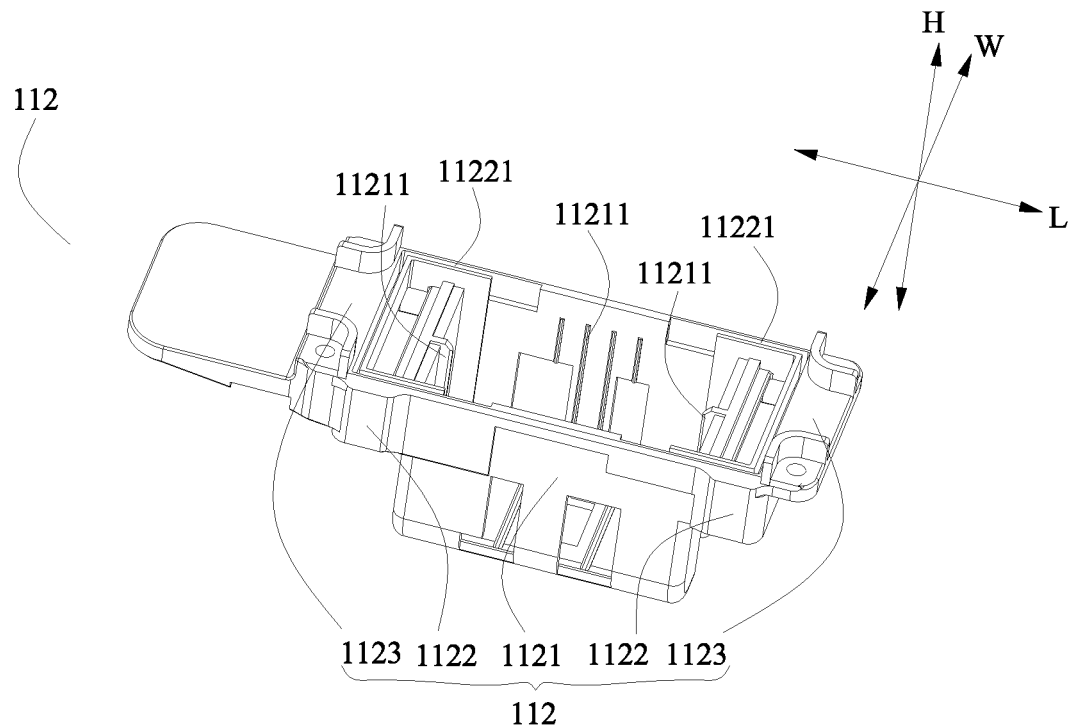
FIG. 15 is a perspective view of an inner shell of the upper cover of FIG. 9.

Referring to FIG. 15, the inner shell 112 may have: a first receiving portion 1121; second receiving portions 1122 respectively formed on both sides of the first receiving portion 1121 in the length direction L; and extending portions 1123 respectively formed outside the second receiving portions 1122 in the length direction L. The first receiving portion 1121 and the second receiving portion 1122 of the inner shell 112 are communicated with the opening of the inner shell 112, the first receiving portion 1121 receives the main body portion 131 of the conductive connection structure 13, the second receiving portion 1122 receives the corresponding conductive connection portion 132, and the extending portion 1123 is fixedly connected to the outer shell 111.

Referring to FIG. 11 to FIG. 14, FIG. 16 and FIG. 17, the insulation sheet 113 may have: an isolating portion 1131 extending in the width direction W; and a fixing portion 1132 positioned on one side of the isolating portion 1131 in the width direction W and extending in the height direction H. The isolating portion 1131 of the insulation sheet 113 isolates the conductive connection structure 13 from the outer shell 111 at the opening of the inner shell 112, and the fixing portion 1132 is fixed to the inner shell 112.

Referring to FIG. 15, a recessed groove 11221 is provided on one side of the second receiving portion 1122 facing the outer shell 111. The fixing portion 1132 of the insulation sheet 113 is inserted into the corresponding recessed groove 11221 and fitted with the recessed groove 11221 so as to be fixed to the inner shell 112.

Referring to FIG. 11 to FIG. 14, FIG. 16 and FIG. 17, the insulation sheet 113 may further have: a plurality of supporting portions 1133 extending in the height direction H and disposed opposite to the fixing portion 1132, and the supporting portion 1133 is supported between the isolating portion 1131 and the outer shell 111. Here, the plurality of supporting portions 1133 increase the electrical gap between the conductive connection structure 13 and the outer shell 111, which improves the safety of use of the multifunctional high-voltage connector 1. In order to further improve the heat dissipation of the upper cover 11, a heat conductive material, such as a heat conductive adhesive or a heat conductive pad, may be filled between the conductive connection structure 13 and the outer shell 111.

Figures 16, 17:
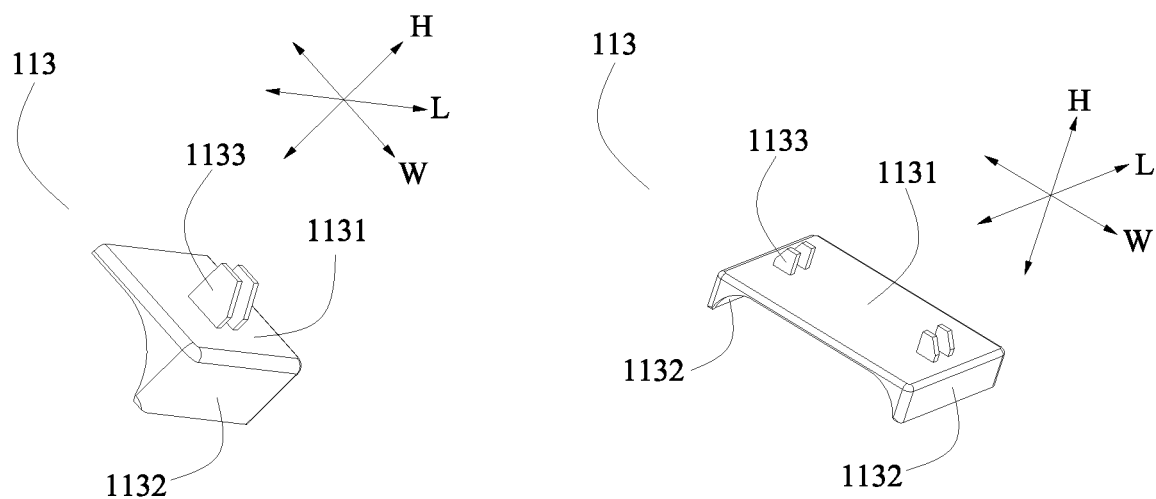
FIG. 16 is a perspective view of an insulation sheet of FIG. 12.
FIG. 17 is a perspective view of an insulation sheet of FIG. 13.
Figure 18:
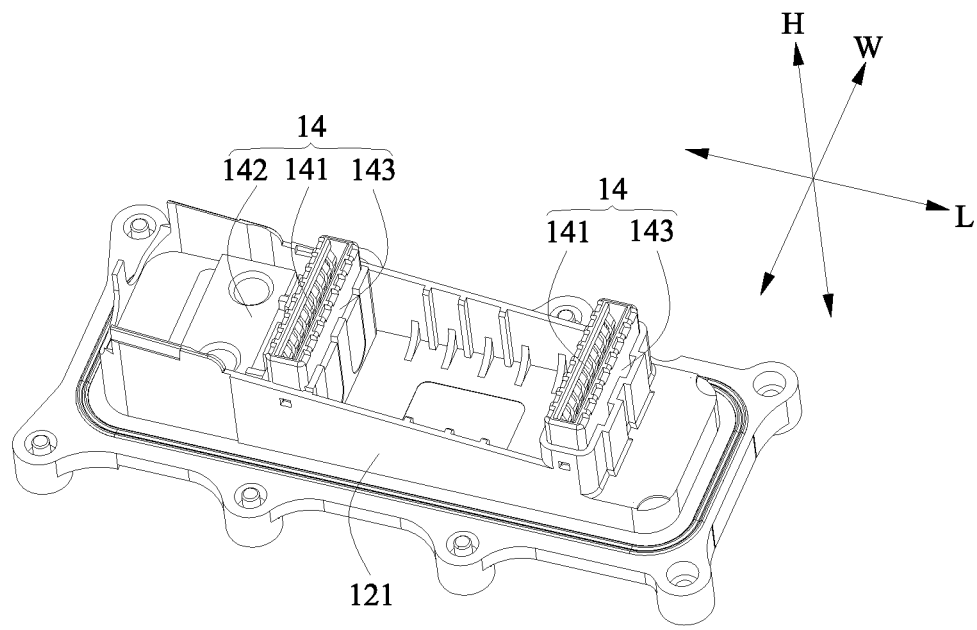
FIG. 18 is a schematic view showing the assembling of a base of the pedestal and a mating terminal.
Figure 19:
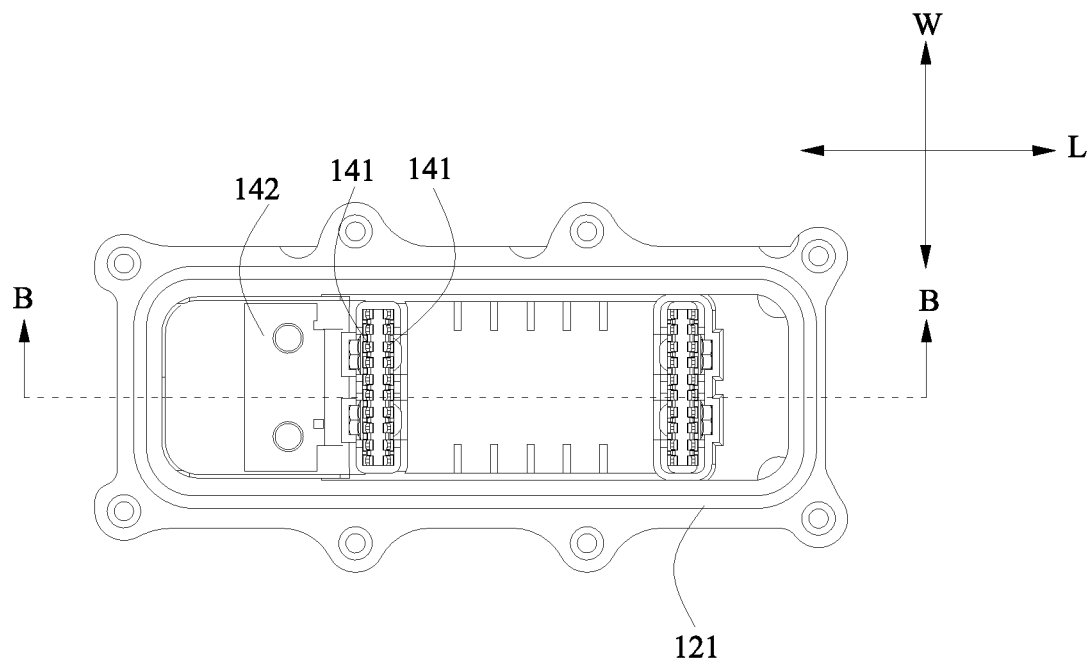
FIG. 19 is a top view of FIG. 18 with a protective shell of the mating terminal removed for the sake of clarity.
Figure 20:
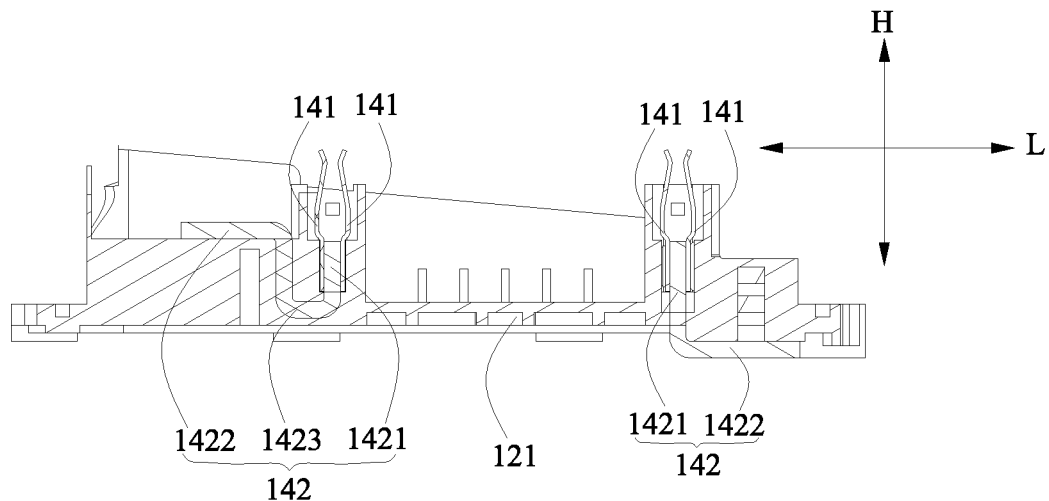
FIG. 20 is a cross sectional view taken along a B-B line of FIG. 19.

Referring to FIG. 17, the fixing portion 1132 of the insulation sheet 113 may be provided as two in number, and the two fixing portions 1132 are respectively formed on both sides of the isolating portion 1131 in the width direction W.

Figure 14:
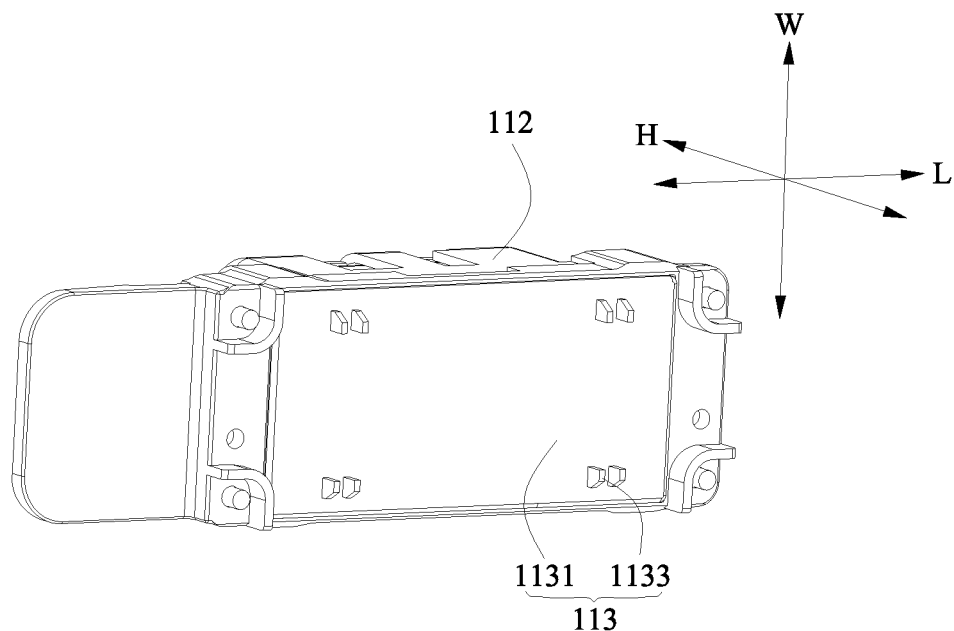
FIG. 14 is another varied example of FIG. 12.

In an embodiment, referring to FIG. 14, the insulation sheet 113 may be provided as one in number, the isolating portion 1131 of the insulation sheet 113 extends in the length direction L and covers the whole surface of the entire conductive connection structure 13 facing the outer shell 111 at the same time. In another embodiment, referring to FIG. 13, the insulation sheet 113 may be provided as two in number, and the two insulation sheets 113 are spaced apart from each other in the length direction L and respectively cover both ends of the conductive connection structure 13 in the length direction L.

Figure 12:
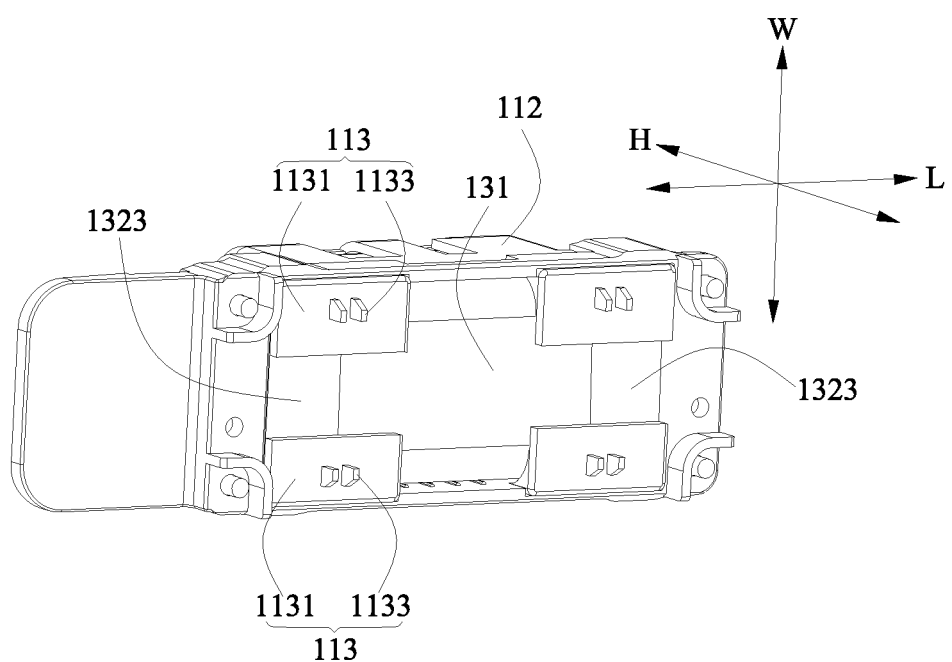
FIG. 12 is a perspective view of FIG. 9 with an outer shell of the upper cover removed.
Figure 13:
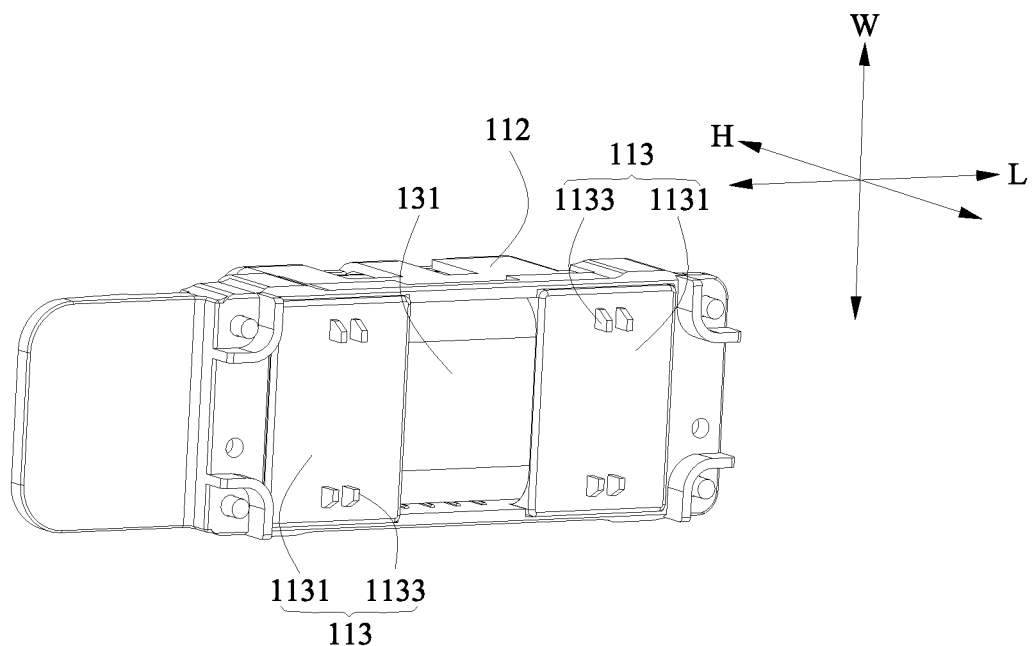
FIG. 13 is a varied example of FIG. 12.

Referring to FIG. 12, the fixing portion 1132 of the insulation sheet 113 may be provided as one in number. Referring to FIG. 8, the insulation sheet 113 may be provided as four in number and disposed in two pairs, the two pairs of insulation sheets 113 are spaced apart from each other in the length direction L. The two insulation sheets 113 of each pair are disposed facing each other in the width direction W and respectively cover both ends of the conductive connection structure 13 in the width direction W. In other words, the four insulation sheets 113 are distributed at four corners of the conductive connection structure 13, and thus isolate the entire conductive connection structure 13 from the outer shell 111, which not only meets the requirements of the insulating protection design, but also reduces the weight of the multifunctional high-voltage connector 1.

Referring to FIG. 18 to FIG. 25, each of the mating terminals 14 may comprise: two elastic sheets 141 disposed facing each other in the length direction L; and a connection sheet 142. Each of the elastic sheets 141 may have: a body portion 1411; and an elastic contact portion 1412 protruding from the body portion 1411 in the height direction H. The connection sheet 142 may have: a first connecting portion 1421 extending in the height direction H; and a second connecting portion 1422 extending in the length direction L. The first connecting portion 1421 of the connection sheet 142 is fixed between the body portions 1411 of the two elastic sheets 141, the second connecting portion 1422 is positioned outside the two elastic sheets 141 in the length direction L.

When the upper cover 11 and the pedestal 12 are assembled, the elastic contact portions 1412 of the two elastic sheets 141 of the mating terminal 14 directly clamp the second contact segment 1322 of the corresponding conductive connection portion 132 of the conductive connection structure 13. Here, based on the elasticity of the elastic sheet 141 itself, the conductive connection portion 132 of the conductive connection structure 13 is firmly fixed between the two elastic sheets 141 of the corresponding mating terminal 14, thereby improving the connection reliability between the conductive connection structure 13 and the mating terminal 14.

Figure 23:
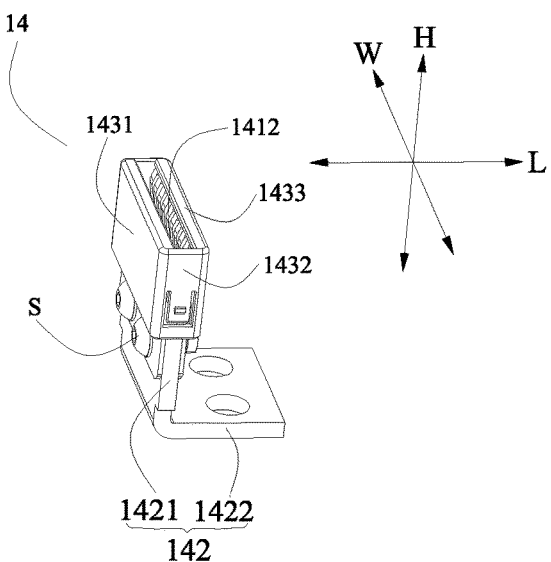
FIG. 23 is a perspective view of the mating terminal at right-side of FIG. 18.
Figure 25:
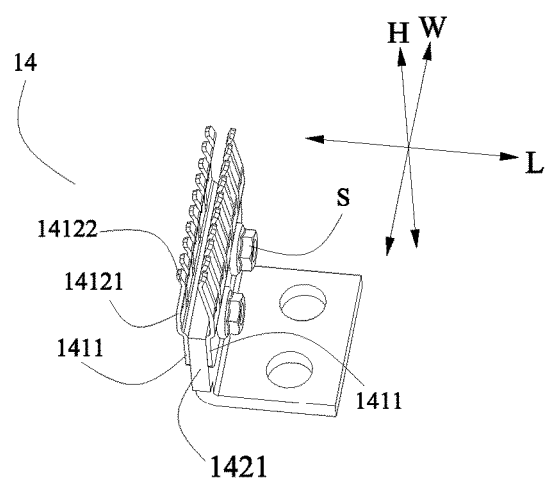
FIG. 25 is a perspective view of the mating terminal of FIG. 23 with the protective shell removed.

For the mating terminal 14 directly connected to the battery assembly, referring to FIG. 23 and FIG. 25, the second connecting portion 1422 of the connection sheet 142 of the mating terminal 14 is directly connected to the first connecting portion 1421. The second connecting portion 1422 of the connection sheet 142 of the mating terminal 14 is positioned on one side of the pedestal 12 facing the battery assembly and directly connected to the battery assembly, therefore it is not necessary to make the conductive connection structure 13 be connected with the mating terminal 14 by the adapter sheet, thereby reducing the connection resistance in the high-voltage circuit of the battery product. In an embodiment, the second connecting portion 1422 of the connection sheet 142 of the mating terminal 14 and the first connecting portion 1421 may form a L-shaped structure.

Figure 22:
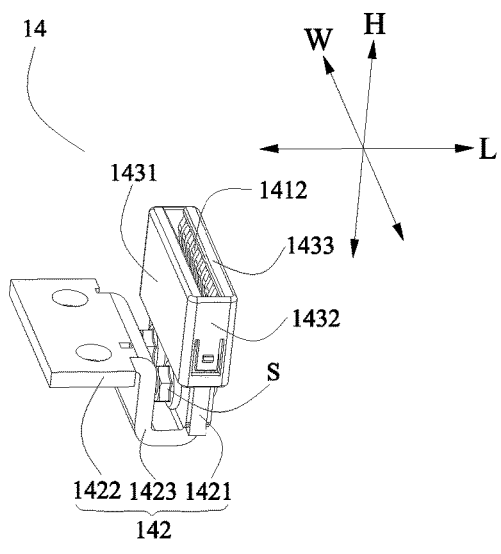
FIG. 22 is a perspective view of the mating terminal at left-side of FIG. 18.
Figure 24:
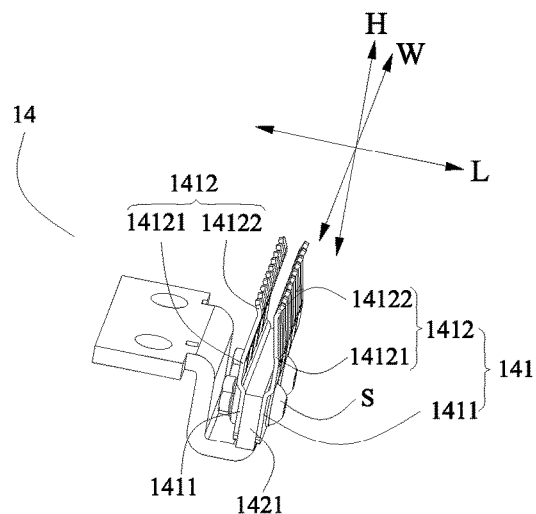
FIG. 24 is a perspective view of the mating terminal of FIG. 22 with the protective shell removed.

For the mating terminal 14 electrically connected to the harness assembly 15 directly, referring to FIG. 22 and FIG. 24, the second connecting portion 1422 of the connection sheet 142 of the mating terminal 14 is spaced apart from the first connecting portion 1421 in the length direction L. The second connecting portion 1422 of the connection sheet 142 of the mating terminal 14 is positioned on one side of the pedestal 12 away from the battery assembly and directly connected to the harness assembly 15, therefore it is not necessary to make the high-voltage connection function component of the multifunctional high-voltage connector 1 be connected with the switch function component by the adapter sheet, thereby reducing the connection resistance in the high-voltage circuit of the battery product. The connection sheet 142 of the mating terminal 14 may further have a third connecting portion 1423 positioned between the first connecting portion 1421 and the second connecting portion 1422, and the third connecting portion 1423 is connected with the first connecting portion 1421 and the second connecting portion 1422. In an embodiment, the third connecting portion 1423 of the connection sheet 142 may be formed in a L-shaped structure.

Referring to FIG. 22 to FIG. 25, the first connecting portion 1421 of the connection sheet 142 of the mating terminal 14 may be fixedly connected to the body portions 1411 of the two elastic sheets 141 by a fastener S.

Referring to FIG. 24 and FIG. 25, the elastic contact portion 1412 of each elastic sheet 141 may have: a first extending segment 14121 connected to the body portion 1411 and extending obliquely toward the other elastic sheet 141 in the height direction H; and a second extending segment 14122 connected to the first extending segment 14121 and extending obliquely away from the other elastic sheet 141 in the height direction H. Here, the first extending segments 14121 and the second extending segments 14122 of the elastic sheets 141 wholly form a structure having a smaller opening at the upper end and a larger waist portion, therefore the clamping force applied to the corresponding conductive connection portion 132 of the conductive connection structure 13 by the elastic sheets 141 of the mating terminal 14 is concentrated on the connected location between the first extending segment 14121 and the second extending segment 14122, thereby improving the connection reliability between the conductive connection structure 13 and the mating terminal 14 and further reducing the connection resistance in the high-voltage circuit of the battery product.

Referring to FIG. 24 and FIG. 25, the elastic contact portion 1412 of each elastic sheet 141 may be provided as multiple in number, the multiple elastic contact portions 1412 are spaced apart from each other in the width direction W. The multiple elastic contact portions 1412 may be formed in a finger-shaped structure.

In order to increase the number of insertions and extractions between the conductive connection structure 13 and the mating terminal 14, a silver may be plated on an outer surface of the elastic contact portion 1412 of the elastic sheet 141.

Referring to FIG. 22 and FIG. 23, the mating terminal 14 may comprise a protective shell 143 having two first side walls 1431 disposed facing each other in the length direction L. The elastic contact portion 1412 of each elastic sheet 141 is positioned between the two first side walls 1431 of the protective shell 143 and elastically presses against the corresponding first side wall 1431 so as to be fixed to the protective shell 143.

Figure 26:
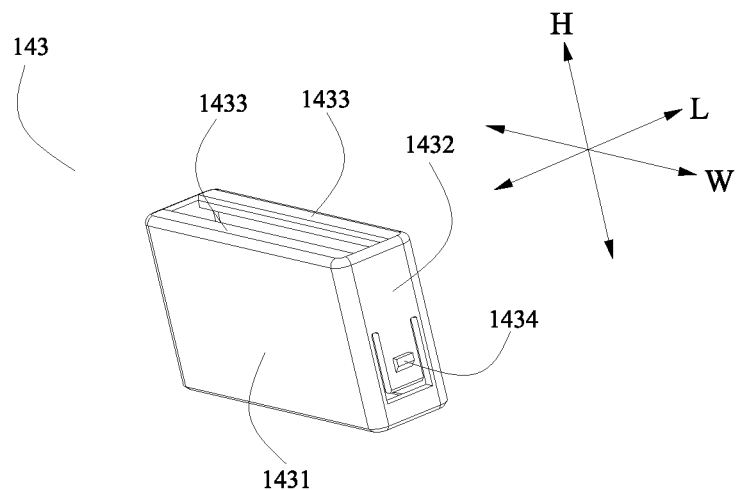
FIG. 26 is a perspective view of the protective shell of the mating terminal.

Referring to FIG. 22, FIG. 23 and FIG. 26, the protective shell 143 may further have: two second side walls 1432 disposed facing each other in the width direction W, each of the second side walls 1432 is connected to the two first side walls 1431; and two top walls 1433 spaced apart from each other in the length direction L, each of the top walls 1433 is correspondingly connected to one of the first side walls 1431 and extends toward the other of the first side walls 1431 in the length direction L. A top end of the elastic contact portion 1412 of the elastic sheet 141 away from the main body portion 1411 elastically presses against the top wall 1433 from below the top wall 1433 of the protective shell 143, so that the elastic contact portion 1412 of the elastic sheet 141 is firmly fixed in the protective shell 143.

Figure 9:
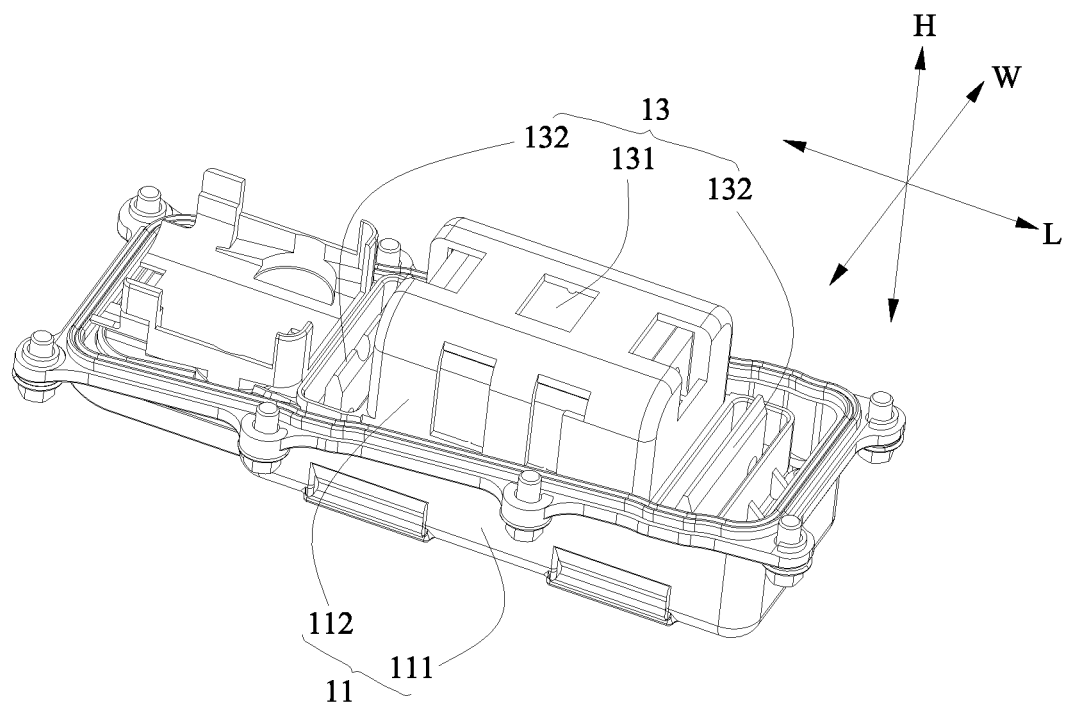
FIG. 9 is a schematic view showing the assembling of the conductive connection structure of FIG. 6 and an upper cover.
Figure 10:
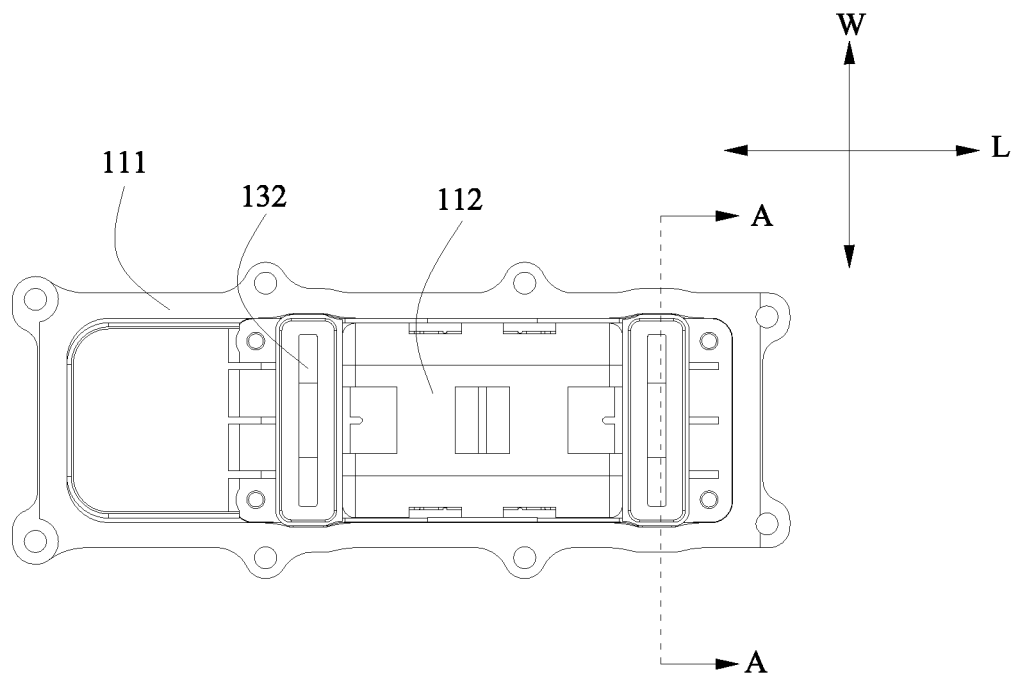
FIG. 10 is a top view of FIG. 9.
Figure 11:
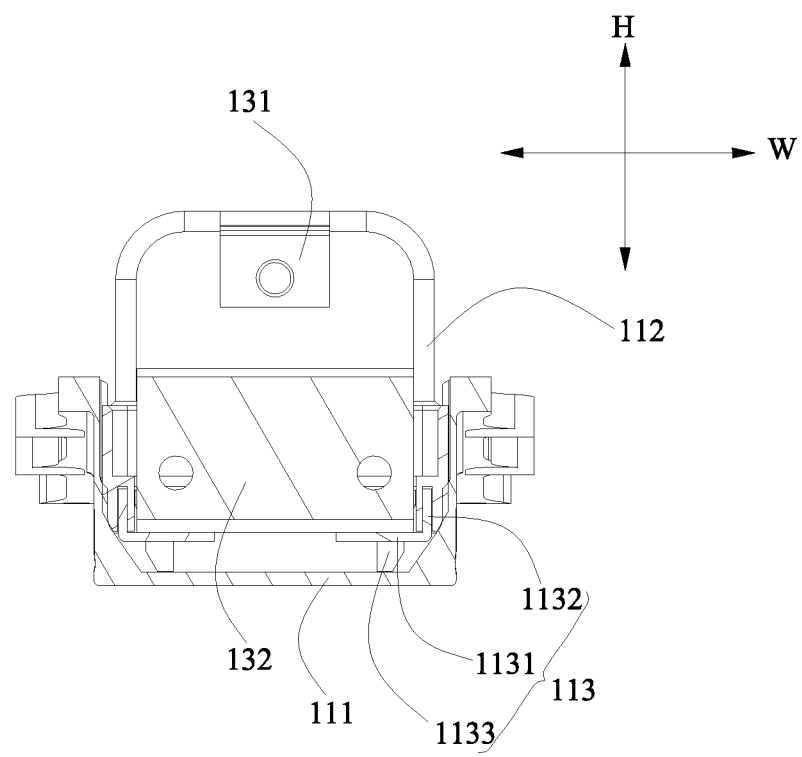
FIG. 11 is a cross sectional view taken along an A-A line of FIG. 9.
Figure 21:
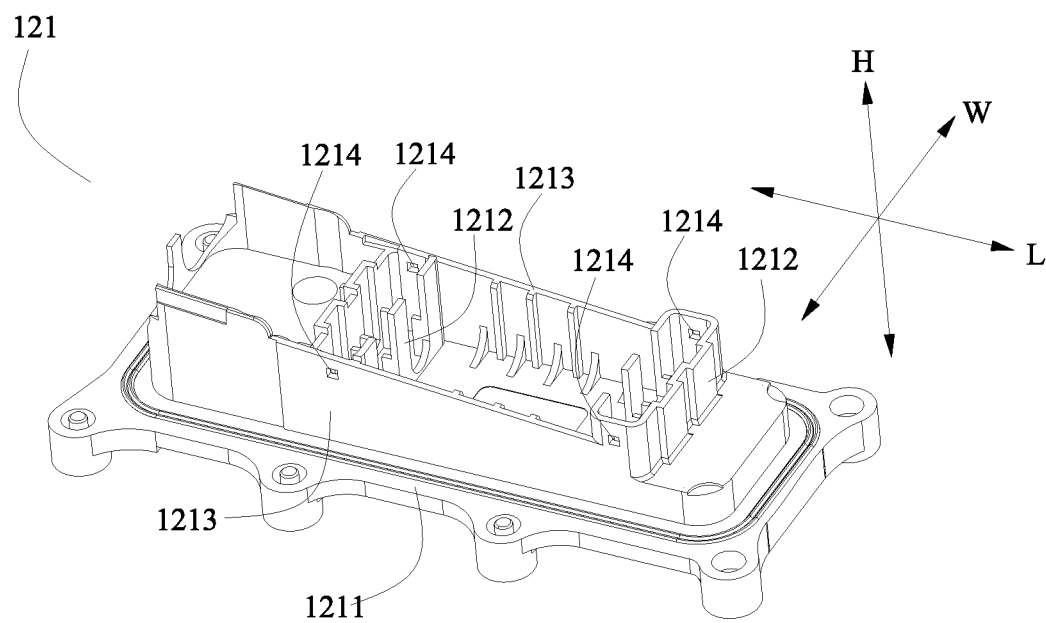
FIG. 21 is a perspective view of the base of the pedestal of FIG. 18.
Figure 27:
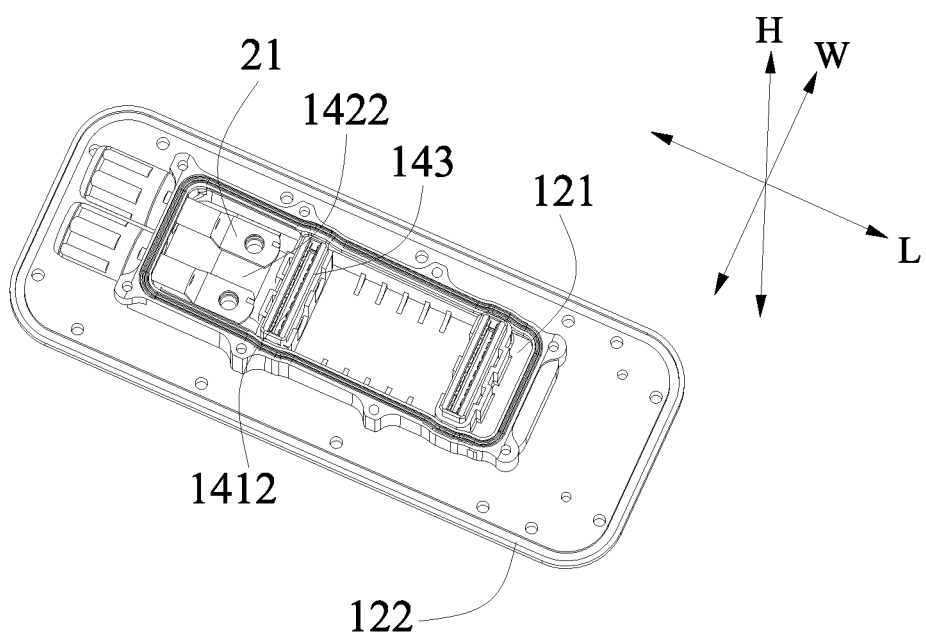
FIG. 27 is a schematic view showing the assembling of the base of the pedestal and the mounting seat.
Figure 28:
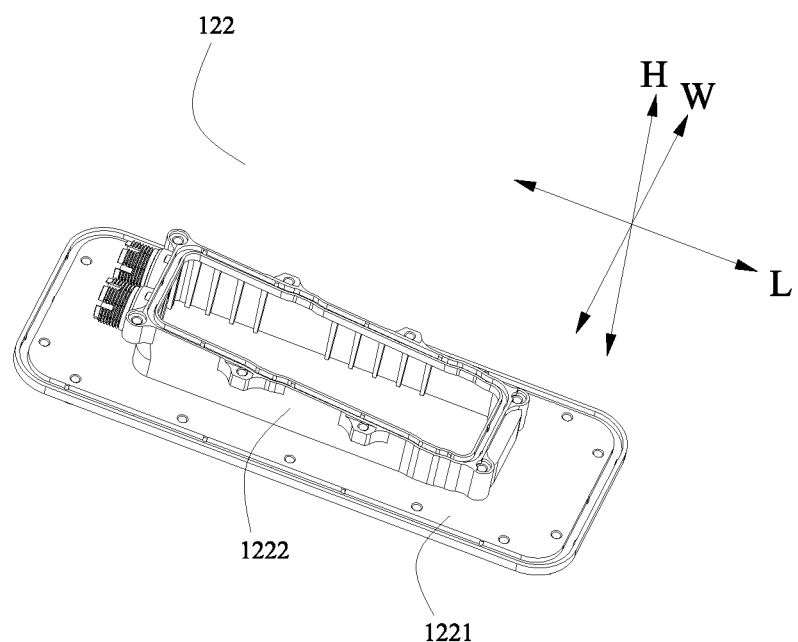
FIG. 28 is a perspective view of the mounting seat of FIG. 27.

In order to facilitate assembling, the upper cover 11 is formed with a slanted port structure (as shown in FIG. 9), the pedestal 12 (as shown in FIG. 27, FIG. 28 and FIG. 21) is also formed with a slanted port structure and is assembled with the upper cover 11. Moreover, the design of the slanted port structures reduces internal space of the multifunctional high-voltage connector 1, thereby being beneficial to improve the space utilization of the battery product.

Referring to FIG. 18 to FIG. 21, the pedestal 12 may comprise a base 121 fixedly mounting the two mating terminals 14. Specifically, the base 121 may have: a first bottom plate portion 1211; two assembling portions 1212 spaced apart from each other in the length direction L, each of the assembling portions 1212 protrudes from the first bottom plate portion 1211 in the height direction H. The connection sheet 142 of the mating terminal 14 and the main body portion 1411 of the elastic sheet 141 are embedded in the first bottom plate portion 1211 of the pedestal 12, and at least a portion of the elastic contact portion 1412 of the elastic sheet 141 extends out of the corresponding assembling portion 1212. The protective shell 143 of the mating terminal 14 is fixed to the corresponding assembling portion 1212.

Referring to FIG. 21, the base 121 may have two side plate portions 1213 spaced apart from each other in the width direction W, each of the side plate portions 1213 protrudes from the first bottom plate portion 1211 in the height direction H. The assembling portion 1212 is formed between the two side plate portions 1213.

Referring to FIG. 21, the base 121 may have a first latching portion 1214 disposed on the assembling portion 1212. Referring to FIG. 26, the protective shell 143 of the mating terminal 14 may further have a second latching portion 1434 latched with the first latching portion 1213 of the base 121 of the pedestal 12 (such as a concave-convex fit) so as to be fixed to the pedestal 12. Specifically, the first latching portion 1214 may be a protrusion, the second latching portion 1434 may be a through-hole structure; or the first latching portion 1214 may be a through-hole structure, the second latching portion 1434 may be a protrusion.

Referring to FIG. 27, the pedestal 12 may further comprise a mounting seat 122 fixedly mounting the base 121. The mounting seat 122 of the pedestal 12 and the box of the battery product may be different components, and the pedestal 12 is fixed to the box via the mounting seat 122. Of course, the mounting seat 122 may also be one of side walls of the box of the battery product.

Referring to FIG. 28, the mounting seat 122 may have: a second bottom plate portion 1221; and a mounting portion 1222 protruding from the second bottom plate portion 1221 in the height direction H. Referring to FIG. 27, the two side plate portions 1213 of the base 121 are positioned in the mounting portion 1222 of the mounting seat 122, and the upper cover 11 is fixedly connected to the mounting portion 1222 of the mounting seat 122.

Referring to FIG. 2, FIG. 3 and FIG. 27, the harness assembly 15 may comprise: a connection terminal 151; and a wire 152 connected to the connection terminal 151. The connection terminal 151 is positioned in the pedestal 12 and connected to the second connecting portion 1422 of the corresponding mating terminal 14, and the wire 152 extends out of the pedestal 12 and is used for electrically connected to the external device of the battery product.

What is claimed is:

1. A multifunctional high-voltage connector, comprising:
an upper cover;
a pedestal detachably assembled with the upper cover;
a harness assembly fixedly mounted to the pedestal;
two mating terminals spaced apart from each other in a first direction of the multifunctional high-voltage connector, and each of the mating terminals being fixedly mounted to the pedestal; and
a conductive connection structure fixedly mounted to the upper cover;
the conductive connection structure being used to connect the two mating terminals in series, and the harness assembly being connected to a proximal one of the two mating terminals in the first direction;
the conductive connection structure comprising: a main body portion; and two conductive connection portions respectively positioned at both ends of the main body portion in the first direction, and each of the conductive connection portions being directly connected to a respective one of the two mating terminals;

the main body portion comprising a tube body having two openings formed at two ends of the tube body in the first direction, and each of the conductive connection portions sealing a corresponding one of the openings; and the main body portion further comprising a conductive fusing body that is electrically connected to the harness assembly via the proximal one of the two mating terminals in the first direction.

2. The multifunctional high-voltage connector according to claim 1, wherein the conductive connection structure is a one-piece structure, and each conductive connection portion directly protrudes from the main body portion in a second direction of the multifunctional high-voltage connector.

3. The multifunctional high-voltage connector according to claim 1, wherein the conductive connection structure is a fuse.

4. The multifunctional high-voltage connector according to claim 1, wherein the upper cover comprises: an outer shell; an inner shell fixed inside the outer shell, and the inner shell is provided with an opening facing the outer shell in the second direction; and at least one insulation sheet, each insulation sheet is fixed to the inner shell;

each conductive connection portion and the main body portion of the conductive connection structure are accommodated in the inner shell via the opening of the inner shell, the insulation sheet isolates the conductive connection structure from the outer shell at the opening of the inner shell.

5. The multifunctional high-voltage connector according to claim 4, wherein the insulation sheet has: an isolating portion extending in a third direction of the multifunctional high-voltage connector; and a fixing portion positioned on one side of the isolating portion in the third direction and extending in the second direction;

the isolating portion of the insulation sheet isolates the conductive connection structure from the outer shell at the opening of the inner shell, and the fixing portion is fixed to the inner shell.

6. The multifunctional high-voltage connector according to claim 5, wherein the insulation sheet further has: a plurality of supporting portions extending in the second direction and disposed opposite to the fixing portion, and the supporting portion is supported between the isolating portion and the outer shell.

7. The multifunctional high-voltage connector according to claim 5, wherein the fixing portion of the insulation sheet is provided as two in number, and the two fixing portions are respectively formed on both sides of the isolating portion in the third direction;

the insulation sheet is provided as one in number, and the isolating portion of the insulation sheet extends in the first direction and covers the whole surface of the entire conductive connection structure facing the outer shell; or the insulation sheet is provided as two in number, and the two insulation sheets are spaced apart from each other in the first direction and respectively cover both ends of the conductive connection structure in the first direction.

8. The multifunctional high-voltage connector according to claim 5, wherein the fixing portion of the insulation sheet is provided as one in number;

the insulation sheet is provided as four in number and disposed in two pairs, the two pairs of insulation sheets are spaced apart from each other in the first direction; the two insulation sheets of each pair are disposed facing each other in the third direction and respectively cover both ends of the conductive connection structure in the third direction.

9. A battery product, comprising a battery assembly, a box and a multifunctional high-voltage connector, wherein the multifunctional high-voltage connector comprises:

an upper cover;

a pedestal detachably assembled with the upper cover;

a harness assembly fixedly mounted to the pedestal;

two mating terminals spaced apart from each other in a first direction of the multifunctional high-voltage connector, and each of the mating terminals being fixedly mounted to the pedestal; and a conductive connection structure fixedly mounted to the upper cover;

the conductive connection structure being used to connect the two mating terminals in series, and the harness assembly being connected to a proximal one of the two mating terminals in the first direction;

the conductive connection structure comprising: a main body portion; and two conductive connection portions respectively positioned at both ends of the main body portion in the first direction, and each of the conductive connection portions being directly connected to a respective one of the two mating terminals;

the main body portion comprising a tube body having two openings formed at two ends of the tube body in the first direction, and each of the conductive connection portions sealing a corresponding one of the openings; and the main body portion further comprising a conductive fusing body that is electrically connected to the harness assembly via the proximal one of the two mating terminals in the first direction.

10. The battery product according to claim 9, wherein the conductive connection structure is a one-piece structure, and each conductive connection portion directly protrudes from the main body portion in a second direction of the multifunctional high-voltage connector.

11. The battery product according to claim 9, wherein the conductive connection structure is a fuse.

12. The battery product according to claim 9, wherein the upper cover comprises: an outer shell; an inner shell fixed inside the outer shell, and the inner shell is provided with an opening facing the outer shell in the second direction; and at least one insulation sheet, each insulation sheet is fixed to the inner shell;

each conductive connection portion and the main body portion of the conductive connection structure are accommodated in the inner shell via the opening of the inner shell, the insulation sheet isolates the conductive connection structure from the outer shell at the opening of the inner shell.

13. The battery product according to claim 12, wherein the insulation sheet has: an isolating portion extending in a third direction of the multifunctional high-voltage connector; and a fixing portion positioned on one side of the isolating portion in the third direction and extending in the second direction;

the isolating portion of the insulation sheet isolates the conductive connection structure from the outer shell at the opening of the inner shell, and the fixing portion is fixed to the inner shell.

14. The battery product according to claim 13, wherein the insulation sheet further has: a plurality of supporting portions extending in the second direction and disposed opposite to the fixing portion, and the supporting portion is supported between the isolating portion and the outer shell.

15. The battery product according to claim 13, wherein
the fixing portion of the insulation sheet is provided as two in number, and the two fixing portions are respectively formed on both sides of the isolating portion in the third direction;
the insulation sheet is provided as one in number, and the isolating portion of the insulation sheet extends in the first direction and covers the whole surface of the entire conductive connection structure facing the outer shell; or
the insulation sheet is provided as two in number, and the two insulation sheets are spaced apart from each other in the first direction and respectively cover both ends of the conductive connection structure in the first direction.

16. The battery product according to claim 13, wherein
the fixing portion of the insulation sheet is provided as one in number;
the insulation sheet is provided as four in number and disposed in two pairs, the two pairs of insulation sheets are spaced apart from each other in the first direction;
the two insulation sheets of each pair are disposed facing each other in the third direction and respectively cover both ends of the conductive connection structure in the third direction.

17. The multifunctional high-voltage connector according to claim 1, wherein
each of the two mating terminals comprises a protective shell comprising a plurality of walls surrounding a space; and
each of the conductive connection portions is partially inserted in the space surrounded by the walls of the respective one of the two mating terminals.

* * * * *